Patented Sept. 2, 1952

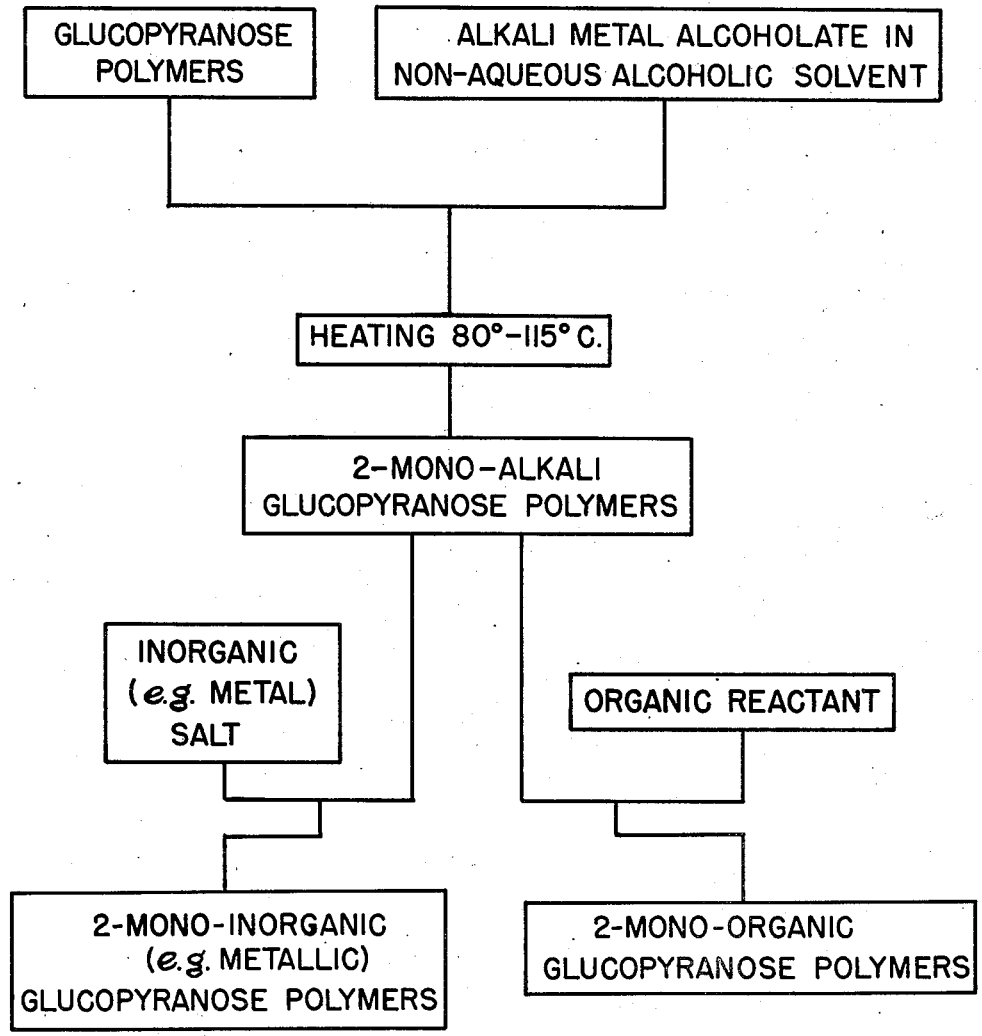

2,609,368

UNITED STATES PATENT OFFICE 2,609,368

CARBOHYDRATE PROCESSES

Kenneth M. Gaver, Columbus, Ohio, assignor to The Ohio State University Research Foundation, Columbus, Ohio, a corporation of Ohio Application October 21, 1950, Serial No. 191,449

14 Claims. (Cl. 260—209)

The inventions disclosed in this application relate to new processes for the formation of 2-substituted glucopyranose polymers. The processes described herein illustrating my invention are designed to produce products from cellulose, starches, dextrins and similar materials.

This application is in part a continuation of my copending application Serial No. 792,826, filed December 19, 1947, now abandoned and in part a continuation of the subject matter disclosed in copending application Serial No. 694,328, filed August 31, 1946. The inventions described herein are designed to produce products like the new products disclosed in my Patent No. 2,518,135.

I have discovered a new method by which the 2-substituted alcoholates of glucopyranose polymers described in said Patent No. 2,518,135 may be prepared. This process is applicable to all types of glucopyranose polymers, including cellulose, starches, dextrins and similar materials. This method consists of the reaction of glucopyranose polymers with an alkali metal alcoholate in a nonaqueous alcoholic system at a temperature of from 80° C. to about 115° C.

I have found that not only cellulose proper but also such materials as oxycellulose, hydrocellulose and lichenin act similar in my processes. I, therefore, include such materials in the term "cellulosic materials" and define for the purposes of this specification the term "cellulosic materials" to include oxycellulose, hydrocellulose, hemicellulose and lichenin as well as true cellulose. All of these compounds where manipulated according to my processes react similarly. The processes when applied to "cellulosic materials" as above defined ordinarily include the synthesis of a monoalkali cellulosic material by reaction of the cellulosic materials with an alkali metal hydroxide in a nonaqueous solution at a temperature of from about 80–81° C. or higher.

The processes described herein apply also to the treatment of starches and dextrins of all kinds. In the treatment of all glucopyranose polymers, including cellulose, starches and dextrins, these new processes have the advantage over the process described in Patent No. 2,518,135 in that while in the patented process water is formed by the reaction between the glucopyranose polymer and the alkali metal hydroxide which tends to dilute the suspension and to slow up the reaction, in this new process no water is formed but instead the reaction produces an alcohol which serves as a solvent for the process.

Prior to my discoveries, the methods normally used for the treatment of cellulose with alkali metal were the mercerization process and the processes (as described by Scherer and Hussey, Schorigin, Peterson and Barry, and Muskat) in which the cellulose is reacted with an alkali metal in ammonia. In this last named process (depending upon the amount of alkali metal present), the reaction produced a mixture of monosubstituted cellulose and polysubstituted cellulose or a cellulose which was substantially completely substituted (i. e. a polysubstituted cellulose). In such mixtures, it was impossible to predetermine or control the positions on which the alkali metal would be substituted nor was it possible to obtain a pure monosubstituted cellulose.

While Schmid and others reported that glycol, glycerin, glucose, glycogen, inulin and starch reacted readily in liquid ammonia with metallic sodium to give exclusively a monometallic derivative, Scherer and Hussey showed that when cellulose was allowed to react with an excess of sodium and liquid ammonia, a trisodium cellulosate was formed. Moreover, Schorigin et al. found that when sodium and cellulose were reacted in liquid ammonia all of the available hydroxyl groups were affected by the reaction. They reported that the reaction was continuous rather than stepwise and that there is no preferential action between the metallic sodium and any particular hydroxyl group. Peterson and Barry reported that when anhydrous cellulose is suspended in liquid ammonia and treated with alkali metal, there is readily produced an alkali metal cellulosate, the reaction being substantially quantitative up to the production of the trimetallic cellulosate.

In the customary method of mercerizing cotton and other cellulose to form a hydrocellulose, cotton has usually been treated with sodium hydroxide in the form of a concentrated (15–25% or higher) aqueous solution. This causes the cotton to shrink, become heavier, denser and stronger and acquire a milky luster. In this process, the metal does not enter the molecule but merely forms an addition product. Treatment of cellulose with dilute sulphuric acid also forms a hydrocellulose while dilute nitric acid forms an oxycellulose. Hydrocellulose and oxycellulose may be formed in various other ways.

In the preparation of cellulose ethers, cellulose has been treated with sodium hydroxide or equivalent alkali either in the form of a concentrated aqueous solution or by mixing the cellulose with solid sodium hydroxide in the presence of sufficient water to dissolve all of the alkali. The alkali cellulose so formed is merely an addition product. The alkali cellulose addition product so formed may be subjected to the action of an etherifying agent such as an alkyl halide, an alkyl sulfate, an aralkyl halide, or other inorganic esters of alkyl or aralkyl alcohols or the like, preferably at elevated temperatures usually in the range from about 90–120° C. and for periods of time varying from six to twenty-four hours or longer.

It has also been proposed to treat cellulose with an alkali metal dissolved in liquid ammonia at low temperatures, preferably below the boiling point of ammonia, and to follow this step without isolation of the product by treatment with an etherifying agent. As stated above, with all of such methods it is impossible to control the position of the reaction.

Dextrins, as is well known, are carbohydrates usually produced by hydrolysis of starch and are intermediate products between starches and the sugars.

However, it is well known that starch on the one hand and the sugars and cellulose on the other have altogether different reactions when mixed with metallic alkali in liquid ammonia. As stated above, Schmid et al. stated that when inulin, starch and glycogen were reacted in liquid ammonia with metallic sodium, they gave an exclusively monometallic derivative and Scherer and Hussey, and Schorigin et al. showed that when cellulose was allowed to react with an excess of sodium in liquid ammonia, all available hydroxyl groups reacted to form a trisodium cellulosate. Muskat reported that potassium in liquid ammonia reacts completely with all of the available hydroxyl groups of the simple sugars and their substitution products. When treated with an alkali metal in liquid ammonia, dextrins, depending on their molecular weight, behave sometimes as sugars and sometimes as starches.

I have now discovered that when cellulosic material, starches and dextrins are reacted with an alkali metal alcoholate in a substantially nonaqueous alcoholic solvent, a monoalkali substituted product is formed. That is to say, I have now discovered that when glucopyranose polymers, including cellulosic material, starches and dextrins (having the glucopyranose units polymerized to an extent of at least ten units per molecule) are reacted with an alkali metal alcoholate in a nonaqueous solvent at a temperature of from 80–81° C. or higher up to about 115° C., the alkali metal is substituted for the hydrogen of the most acidic hydroxyl group to form a monosubstituted glucopyranose polymer in which the alkali metal replaces the hydrogen of the No. 2 hydroxyl unit of substantially all of the glucose units of the cellulosic material, starch or dextrin (i. e. the hydroxyl group which is next adjacent to the carbonyl group of each glucose unit) to form a 2-alkali metal glucopyranose polymer (cellulosate, starchate or substituted dextrin) in pure form.

When dextrins are reacted with an alkali metal dissolved in liquid ammonia, the reaction depends on the type of dextrin. In some cases in liquid ammonia, all of the hydrogens of all of the free hydroxyl groups are reacted to form polysubstituted alkali dextrins. In other cases, only one of the free hydroxyl groups may be affected. The reaction ranges from a reaction similar to that of the sugars to a reaction similar to that of the starches but as stated above where the reaction is induced by moderate heating with a nonaqueous alcoholic solution of alkali metal alcoholate, only one hydroxyl group is reacted. Preferably, I form my dextrins by the hydrolysis of starches by one or more of the usual methods. Then I alkalate the dextrin so formed by the substitution of an alkali metal in place of the hydrogen of the most acidic hydroxyl group of the glucopyranose units of the dextrin.

I have found that by the Williamson reaction, any such 2-substituted alkali metal glucopyranose polymer may be converted to a 2-organic glucopyranose polymer, or glucopyranose ether. In fact, I may substitute for the alkali metal any other desired atom or radical (having a valence of one) as, for example, metal salt and other desired suitable inorganic reagents to obtain any desired substituted inorganic glucopyranose product. I can thereafter further hydrolyze the substituted glucopyranose polymer to obtain a substituted sugar. Especially substituted dextrins are useful as intermediate products in forming desirable substituted sugars. They are also useful in modifying and improving the characteristics of dextrin adhesives.

It is an object therefore of my invention to provide new and useful processes of forming monosubstituted glucopyranose polymers.

It is a further object of my invention to provide a new process of reacting glucopyranose polymers with alkali metal alcoholates.

It is a further object of my invention to provide a new method of forming nonaqueous alkali metal substituted glucopyranose polymers and of absorbing any water which is either initially present or which is formed by the reaction.

Further objects comprise the provision of new methods for the formation of 2-monosubstituted glucopyranose polymers including 2-monosubstituted cellulosates, 2-monosubstituted starchates and 2-monosubstituted dextrins.

Further objects and features of the present invention will be apparent from the following description, reference being had to the accompanying drawings wherein preferred forms of embodiments of the invention are clearly shown.

In the drawings:

Fig. 1 is a flow sheet disclosing a method of forming 2-monoalkali glucopyranose polymers, 2-monoorganic glucopyranose polymers, 2-monometallic glucopyranose polymers, and 2-mononmetallic inorganic glucopyranose polymers.

In general, the inventions disclosed herein are illustrated by processes of forming (1) a 2-monoalkali cellulosate, a 2-monocellulose ether, and a 2-monometallic cellulosate; (2) a 2-monoalkali starchate, a 2-monometallic starchate, and a 2-monoalkyl starchate, and (3) a 2-monoalkali dextrin, a 2-monoalkyl dextrin and a 2-monometallic dextrin. For example, cellulose may be first treated with a substantially nonaqueous solution of an alkali metal alcoholate at a temperature of from 80–81° C. or higher up to about 115° C. so that the alkali metal alcoholate reacts with the glucose residue units of the cellulose to replace by the alkali metal the hydrogen of the hydroxyl group next adjacent to the carbonyl group thereof so as to form a 2-monoalkali cellulosate. This 2-monoalkali cellulosate is then reacted with an alkyl halide or similar organic reactant to substitute an organic group in place of the alkali metal of the cellulosate to form a cellulose ether (organic cellulosate) in which the organic group is attached in all cases to the number two carbon atom (i. e. the carbon atom next adjacent to the carbonyl group). Alternatively the monoalkali cellulosate may be reacted with a metal or other inorganic salt to form a metal or other inorganic cellulosate.

Also when a starch or a dextrin is treated with an alkali metal alcoholate in solution in a substantially nonaqueous solvent at a temperature of from 80° C., a monoalkali substituted starchate or dextrin is formed in which the alkali metal is substituted for the hydrogen of the No. 2 carbon (which is the most acidic hydroxyl group) to form the 2-monosubstituted starchate or dextrin. These monosubstituted starchates and dextrins may then be reacted with alkyl halides or similar organic reactants to substitute an organic group in place of the alkali metal of the substituted starchate or dextrin to form an alkyl starchate or dextrin ether in which the organic group is attached in all cases to the No. 2 carbon atom (i. e. the carbon atom next adjacent to the carbonyl group). Alternatively the monoalkali starchate or dextrin may be reacted with a metal or other inorganic salt to form a metal or other inorganic starchate or substituted dextrin.

In preparing the 2-monoalkali glucopyranose polymers, the 2-mono-organic glucopyranose polymers and the 2-monoinorganic glucopyranose polymers referred to above, we have investigated the effect of the following factors on the reaction.

NATURE OF SOLVENT

The solvent must be substantially nonaqueous and is preferably alcoholic. It is found that any of the following alcohols may be used, provided that certain other variables are sufficiently controlled. It must be understood, however, that not all solvents mentioned have the same utility in the process. It must also be understood that any other nonaqueous solvent which will dissolve the alkali even in small amounts is a suitable vehicle in which to carry out the reaction provided that certain other variables are sufficiently controlled. Following is a list of alcohols which have been found to be satisfactory:

Alcohols which may be used allyl
iso-amyl
n-amyl
sec.-amyl
tert.-amyl
anisyl
benzhydrol
benzoylcarbinol
benzyl
2,3-butanediol
n-butyl
iso-butyl
sec.-butyl
tert.-butyl
sec. butyl carbinol
β(p-tert. butyl phenoxy) ethyl
capryl
ceryl
cetyl
3-chloro-2-propenol-1
cinnamic
crotyl
cyclohexanol
decyl
diacetone
diethyl carbinol
dimethyl benzyl carbinol
dimethyl ethynyl carbinol
dimethyl n-propyl carbinol
dimethyl isopropyl carbinol
di-n-propyl carbinol
di-iso-propyl carbinol
ethyl
2-ethyl butyl
2-ethyl hexanol
furfuryl
n-heptyl
n-hexyl
sec.-hexyl
lauryl
methallyl
methyl
methyl amyl
methyl butyl carbinol
o-methyl cyclohexanol
m-methyl cyclohexanol
p-methyl cyclohexanol
2-methyl pentanol-1
methyl isopropyl carbinol
n-nonyl
n-octyl
octanol-2
phenyl-propyl
n-propyl
iso-propyl
tetrahydrofurfuryl
triethyl carbinol
triphenyl carbinol

Various polyhydric alcohols which may also be used ethylene glycol
ethylene glycol monomethyl ether
ethylene glycol monoethyl ether
ethylene glycol monobenzyl ether
ethylene glycol monobutyl ether
diethylene glycol
diethylene glycol monomethyl ether
diethylene glycol monoethyl ether
diethylene glycol monobenzyl ether
diethylene glycol monobutyl ether
di-propylene glycol
glycerol
glycerol $\alpha$-n-butyl ether
glycerol $\alpha,\alpha'$-dimethyl ether
glycerol $\alpha,\gamma$-diphenyl ether
glycerol $\alpha$-monomethyl ether
hexamethylene glycol
2-methyl-2,4-pentanediol
propylene glycol
triethylene glycol
trimethylene glycol It is clear therefore that all nonaqueous solvents capable of dissolving sodium hydroxide to the extent of 0.04 N or higher are satisfactory. Some of the lower alcohols (such as methanol and to a lesser extent ethanol, propanol, etc.) which readily give up a hydrogen ion in solution are not satisfactory with all types of alkali because of the relatively high acidity of such alcohols.

TEMPERATURE

Any temperature from 80–810° C. up to about 115° C. in an open or closed system produces a 2-monoalkali product. Somewhere above about 115° C. a reaction occurs on the No. 3 carbon atom and in such cases the product is no longer a monoalkali product. This monoalkali reaction can be driven to completion at temperatures somewhat lower than 80° C. However, under usual operating conditions, the raising of the temperature up to about 80–81° C. is one of the most important considerations.

PRESSURE

Apparently there is but very slight volume change occurring in the monoalkali reaction. Pressures up to about 55 lbs. have been used with no effect on the course of the reaction or upon the product produced by the reaction. It is very probable that any pressure may be used provided the temperature and other requirements are met.

TIME OF REACTION

Time of the reaction varies with the solvent chosen. With ethyl alcohol any time beyond two hours does not alter the course of the reaction nor the character of the product. With butanol, the reaction is complete well before the butanol (technical grade) reaches the boiling point of 115° C. A generalization may be made that the reaction is completed in two hours at 80–81° C. or instantaneously at higher temperatures.

ALKALI CONCENTRATION

It has been repeatedly demonstrated that at temperatures under the temperature of 115° C., the reaction is independent of alkali concentration and the same product is always obtained provided there is sufficient alkali present to satisfy the requirements of the product. At the lower temperature range (i. e. 80° C.) it is advisable to use an excess of alkali in order to complete the reaction within a two hour period. At the higher temperature range (i. e., 81–115° C.), only the amount of alkali approaching the stoichiometric equivalent is necessary or desirable. The mother liquor from the latter reaction always shows a faint alkalinity of approximately 0.04 N.

NATURE OF THE ALKALI

All of the alkali metal alcoholates yield similar products. For example, sodium methylate, sodium propylate, and sodium butylate all yield chemically similar products. Any alkali metal alcoholate having an ionization constant of $2 \times 10^{-5}$ or greater will react provided that it is more than very slightly soluble in the chosen reaction solvent and also provided that the molecular size of the reaction molecule is not too large to locate itself to react with the glucopyranose polymer.

NATURE OF THE GLUCOPYRANOSE

The carbohydric material which is to be treated may be any carbohydrate or similar material in which there is a hydroxyl or similar group positioned on the carbon which is adjacent to a carbon atom forming a part of a carbonyl group. For example, celluloses, starches, dextrins, dextrans, sugars, hexosans, pentosans, and mixed hexosans and pentosans are usable. Various kinds of these classes are usuable, as for example, the various kinds of celluloses, starches and dextrins set out below.

NATURE OF THE CELLULOSE

Similar reaction products were produced by using cotton, linen, jute, and ramie cellulose; oxycellulose; hydrocellulose; and lichenin. Thus as pointed out above, an alkali metal atom can be substituted on the number two carbon of the basic cellulose unit by treating cellulosic materials (including also oxycellulose, hydrocellulose and lichenin) in approximately stoichiometric quantities with an alkali alcoholate (having an ionization constant of $2 \times 10^{-5}$ or greater) in a nonaqueous solvent (containing enough of the alkali in solution to produce a solution corresponding to a sodium hydroxide solution of 0.04 N or higher) at a temperature of 80° C. or higher (with or without agitation) for a period of two hours or longer. In such cases a reaction will occur on the second carbon atom which will go practically to completion provided alkali is present in sufficient quantity to permit one mole of alkali to react with one mole (162 grams) of cellulosic material. Under certain described exceptions the temperature may be 80° C. or lower, and under other described conditions the time may be under two hours.

If desired true cellulose may be first treated (as with sodium hydroxide) to produce a hydrocellulose or first treated (as with dilute nitric acid) to produce an oxycellulose. The hydrocellulose or the oxycellulose, as the case may be, may then be isolated or purified as by washing, etc. and then treated exactly as decribed above and with the same limiting factors to transform it to a 2-monosubstituted hydrocellulose or 2-monosubstituted oxycellulose as the case may be. Lichenin or other hemicellulose may be treated in the same manner and subject to the same limitations as described above to produce a 2-monosubstituted hemicellulose.

NATURE OF STARCH

Similar reaction products can be prepared using waxy rice, yuccas, sergo, arrowroot, sweet potato, potato, corn, wheat, tapioca and amioca starches and a series of thin boiling starches.

NATURE OF THE DEXTRIN

Similar products were prepared using potato, sweet potato, wheat, tapioca and corn dextrins. Moreover, acid, alkali, heat converted, oxidative corn dextrins enzymatically synthesized $\alpha$, $\beta$ and $\gamma$ Schardinger dextrins and many other dextrins have been used to prepare similar products. Thus the various dextrins used varied in the size of the molecules from dextrins having molecules containing about ten glucopyranose units to the molecule up to dextrins which have molecules of approximately the size of starch.

Generally in the case of the acid converted corn dextrins, the color becomes increasingly darker as conversion increases and as the number of free aldehyde groups increases.

MECHANISM OF THE REACTION

My improved process involves a reaction in which in one sense it may be said that no water (which would tend to slow up and eventually prevent the reaction) is formed or in another sense it may be said at times that the water formed is removed by a simultaneous reaction. In the first sense the equation involved may be said to be:

(1) 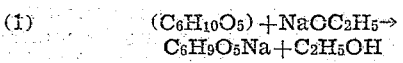
$C_6H_9O_5Na + C_2H_5OH$

In the second sense the following equations may be involved especially where either the solvent or the glucopyranose polymer is not entirely nonaqueous:

(2) 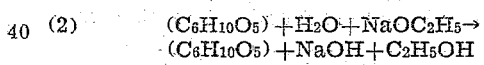
$(C_6H_{10}O_5) + NaOH + C_2H_5OH$ (3)
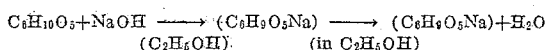
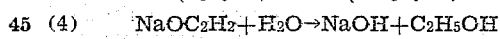

(4) $NaOC_2H_2 + H_2O \rightarrow NaOH + C_2H_5OH$ etc. Thus by the use of the alcoholate, the water formed in the main reaction is removed by absorption to produce more alcohol and alkali hydroxide.

FORMATION OF ETHERS

Any such monoalkali glucopyranose polymers may be reacted with any organic reactant (as for example an organic halide) to produce a 2-monoorganic glucopyranose polymer. To accomplish this object I treat the monoalkali with an etherifying agent (i. e., organic reactant). I may suspend the 2-monoorganic glucopyranose polymer for from one to ten minutes in from one to ten times the calculated quantity of an etherifying agent and heat (with pressure if desired) to 80–81° C. or higher (e. g., to 92° C.) for from two to twenty-four hours. By this operation I obtain a monoorganic glucopyranose polymer which when the reaction is completed produces a 2-monoorganic glucopyranose polymer each unit of which has a formula of

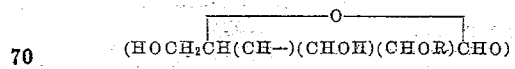

A dispersing solvent may be used as desired but is unnecessary. The reactants may be agitated or not as desired. Pressure may be applied or not as desired. The monoalkali glucopyranose polymer may be treated with the organic compound in other ways than above specified if desired. In many of our experiments we used organic halides but any organic compound containing a replaceable halogen or a similarly reacting group is satisfactory. For instance, dimethyl sulfate, amyl nitrate, nitroparaffin, organic phosphate, acetates, benzoates, etc. are satisfactory. As further examples of the reactants which will react with the monoalkali metal glucopyranose polymer to produce the corresponding 2-monoethers, the following may be mentioned.

acetodichlorohydrin
allyl bromide
allyl chloride
allyl iodide
n-amyl bromide
iso-amyl bromide
iso-amyl chloride
tert.-amyl chloride
amylene dichloride
iso-amyl iodide
benzalacetophenone dibromide
benzal chloride
benzotrichloride
benzyl bromide
benzyl chloride
bromoacetic acid
ω-bromoaceto-β-naphthone
α-bromo-n-butyric acid
2-bromo-1-chloropropane
bromocyclohexane
β-bromoethyl ether
β-bromoethyl phenyl ether
bromoform
2-bromo-n-octane
p-bromophenacyl bromide
bromopicrin
α-bromopropionic acid
β-bromopropionic acid
γ-bromopropyl phenyl ether
α-n-valeric acid
α-bromo-iso-valeric acid
γ-butyl bromide
iso-butyl bromide
sec.-butyl bromide
tert.-butyl bromide
n-butyl chloride
iso-butyl chloride
sec.-butyl chloride
tert.-butyl chloride
n-butyl chloroacetate
iso-butyl chlorocarbonate
α-butylene bromide
β-butylene bromide
iso-butylene bromide
n-butylidene chloride
n-butyl iodide
iso-butyl iodide
sec.-butyl iodide
tert.-butyl iodide
cetyl bromide
cetyl iodide
chloral
chloroacetamide
chloroacetodiethylamide
chloroacetic acid
chloroacetone
chloroacetonitrile
chlorobutane
β-chlorobutyric acid
γ-chlorobutyronitrile
chlorocyclohexane
β-chloroethyl acetate
β-chloromethyl chlorocarbonate chloroform
chloropicrin
α-chloropropionic acid
β-chloropropionic acid
β-chloropropionitrile
γ-chloropropyl chlorocarbonate
decamethylene bromide α,β-dibromobutyric acid
2,3-dibromopropene
α,β-dibromopropionic acid
β,γ-dibromopropyl alcohol
3,5-dibromopyridine
α,β-dibromosuccinic acid
dichloroacetic acid
γ,γ'-dichloropropyl ether
β,β'-dichloroisopropyl ether
epibromohydrin
epichlorohydrin
ethyl bromide
ethyl bromoacetate
ethyl α-bromo-n-butyrate
ethyl α-bromo-n-caproate
ethyl bromomalonate
ethyl α-bromopropionate
ethyl β-bromopropionate
ethyl α-bromo-isovalerate
ethyl chloride
ethyl chloroacetate
ethyl α-chloroacetoacetate
ethyl chlorocarbonate
ethyl β-chloropropionate
ethyl dibromoacetate
ethyl dibromomalonate
ethyl dichloroacetate
ethylene bromohydrin
ethylene bromide
ethylene chloride
ethylene chlorobromide
ethylene chlorohydrin
ethylidene bromide
ethylidene chloride
ethyl iodide
ethyl trichloroacetate
glycerol α,γ-dibromohydrin
glycerol α,γ'-dichlorohydrin
glycerol α,β-dichlorohydrin
glycerol α-monochlorohydrin
n-heptyl bromide
n-heptyl iodide
hexachloroethane
hexamethylene bromide
n-hexyl bromide
n-hexyl chlorocarbonate
n-hexyl iodide
iodoacetic acid
iodoform
lauryl bromide
lauryl chloride
methyl bromide
methyl bromoacetate
methyl β-bromopropionate
methyl chloroacetate
methyl chlorocarbonate
methyl chloroform
methyl α,β-dibromopropionate
methyl α,β-dichloropropionate
methylene bromide
methylene chloride
methylene iodide
myristyl bromide
methyl iodide
n-nonyl bromide
n-octadecyl bromide
n-octadecyl chloride phenacyl bromide
phenacyl chloride
n-propyl bromide isopropyl bromide
n-propyl chloride
isopropyl chloride
propylene bromide
propylene bromohydrin
propylene chloride
propylene chlorobromide
propylene chlorohydrin
s-tetrabromoethane
s-tetrachloroethane
tetrachloroethylene
1,1,2-tribromoethane
tribromoethylene
1,2,3-tribromo-2-methyl propane
1,2,3-tribromopropane
trichloroacetic acid
trichloro-tert.-butyl alcohol
2,2,3-trichlorobutyric acid
1,1,2-trichlorethane
trichloroethylene
1,2,3-trichloropropane
triglycol dichloride
trimethylene bromide
trimethylene bromohydrin
trimethylene chloride
trimethylene chlorobromide
trimethylene chlorohydrin
triphenylchloromethane
o-xylyl bromide
m-xylyl bromide
p-xylyl bromide
o-xylylene bromide
o-xylylene chloride and similarly reacting chemicals including especially the esters.

The alkali cellulosate may, if desired, be dispersed with the organic reactant in any suitable solvent. In addition to the solvents mentioned above as solvents for the alkali hydroxides, the following dispersing solvents may also be used:

sec.-amyl benzene
tert.-amyl benzene
benzene
n-butyl benzene
sec.-butyl benzene
tert.-butyl benzene
cunene
cyclohexane
2,7-dimethyl octane
ethyl cyclohexane
heptane
hexane
hexadecane
ligroin
methyl cyclohexane
nonane n-octane
iso-octane
n-pentane
petroleum ether
propyl benzene
tetraisobutylene
tetradecane
toluene
tri-isobutylene
trimethyl butane
trimethylethylene
2,2,4-trimethyl pentane
triphenyl methane
o-xylene
m-xylene
p-xylene and various others.

The following ketones may also be used:
acetone
acetophenone
anisolacetone
benzalacetone
benzophenone
benzoylacetone
diethyl
diisopropyl
ethyl phenyl
ethyl undecyl
methyl amyl
methyl butyl
o-methyl cyclohexanone
m-methyl cyclohexanone
p-methyl cyclohexanone
methyl ethyl
methyl hexyl
methyl n-propyl
methyl iso-propyl and various others.

The following ethers may also be used:

allyl
allyl ethyl
n-amyl
iso-amyl
anethole
anisole
benzyl
benzylmethyl
n-butyl benzyl
n-butyl
n-butyl phenyl
1,4-dioxane
di-n-propyl
benzyl ethyl chloromethyl
dichloromethyl
diethylene glycol
diethyl
ethyl butyl
ethylene glycol
dibenzyl
ethylene glycol
diethyl
ethyl
phenetole
n-hexyl
n-propyl
iso-propyl and various others.

By these various lists we do not mean to exclude any other solvents, organic reacting materials and other dispersing solvents.

Various metal and nonmetal inorganic glucopyranose polymers may also be synthesized starting with the alkali metal glucopyranose polymers prepared as set out above. For example, we can prepare the following substituted products:

(a) Aluminum chloroglycopyranose polymer by reaction with aluminum chloride in ether.

(b) Lead chloro glucopyranose polymer by reaction with lead chloride in ether.

(c) Arsenic chloro glucopyranose polymer by reaction with arsenic chloride in ether.

(d) Barium bromo glycopyranose polymer by reaction with barium bromide in alcohol.

(e) Bismuth chloro glucopyranose polymer by reaction with bismuth chloride in acetone.

(f) Cadmium bromo glucopyranose polymer by reaction with cadmium bromide in alcohol.

(g) Calcium chloro glucopyranose polymer by reaction with calcium chloride in alcohol.

(h) Calcium chlorate glucopyranose polymer by reaction with calcium chlorate in alcohol.

(i) Cerium nitrate glucopyranose polymer by reaction with cerium nitrate in alcohol.

(j) Chromium chloro glucopyranose polymer by reaction with chromium chloride in alcohol.

(k) Cobalt chloro glucopyranose polymer by reaction with cobalt chloride in alcohol.

(l) Copper chloro glucopyranose polymer by reaction with copper chloride in alcohol.

(m) Iron chloro glucopyranose polymer by reaction with iron chloride in ether.

(n) Iron perchlorate glucopyranose polymer by reaction with iron perchlorate in alcohol.

(o) Lead aceto glucopyranose polymer by reaction with basic lead acetate in alcohol.

(p) Magnesium chloro glucopyranose polymer by reaction with magnesium chloride in alcohol.

(q) Magnesium aceto glucopyranose polymer by reaction with magnesium acetate in alcohol.

(r) Manganese chloro glucopyranose polymer by reaction with manganese chloride in alcohol.

(s) Mercuric chloro glucopyranose polymer by reaction with mercuric chloride in alcohol.

(t) Nickel chloro glucopyranose polymer by reaction with nickel chloride in alcohol.

(u) Phosphorus dichloro glucopyranose polymer by reaction with phosphorus trichloride in ether.

(v) Platinum chloro glucopyranose polymer by reaction with platinum chloride in ether.

(w) Silver glucopyranose polymer by reaction with silver nitrate in alcohol.

(x) Stannous chloro glucopyranose polymer by reaction with stannous chloride in alcohol.

(y) Stannic chloro glucopyranose polymer by reaction with stannic chloride in ether.

(z) Strontium bromo glucopyranose polymer by reaction with strontium bromide in alcohol.

(aa) Thorium chloro glucopyranose polymer by reaction with thorium chloride in alcohol.

(bb) Zinc chloro glucopyranose polymer by reaction with zinc chloride in alcohol.

(cc) Uranium glucopyranose polymer by reaction with uranyl acetate in alcohol.

Following is a list of some additional salts which when reacted with our monoalkali glucopyranose polymer produce metallic, non-metallic or other derivative glucopyranose polymer by double decomposition: aluminum bromide; aluminum iodide; aluminum nitrate; antimony chloride; antimony iodide; arsenic fluoride; arsenic iodide; arsenic sulfide; barium perchlorate; barium thiocyanate; beryllium bromide; beryllium chloride; beryllium fluoride; beryllium iodide; boron bromide; cadmium iodide; cadmium nitrate; cadmium sulfate; calcium bromide; calcium perchlorate; calcium chromate; calcium iodide; calcium nitrate; calcium thiocyanate; cerium bromide; cerium iodide; chromium bromide; chromium fluoride; chromium nitrate; chromium sulfate; cobalt bromide; cobalt chlorate; cobalt perchlorate; cobalt iodide; cobalt nitrate; cobalt sulfate; cobalt sulfide; columbium chloride; columbium fluoride; copper bromide; copper fluoride; copper nitrate; dyspromium chloride; dyspromium bromide; dyspromium iodide; dyspromium bromate; erbium chloride; erbium nitrate; gallium sulfate; germanium bromide; germanium chloride; gold bromide; gold chloride; gold cyanide; indium perchlorate; indium nitrate; radium bromide; uridium bromide; iron bromide; iron iodide; iron nitrate; iron sulfate; iron thiocyanate; lanthanum bromide; lanthanum chloride; lanthanum nitrate; lead chlorate; magnesium bromide; magnesium chlorate; magnesium iodide; magnesium nitrate; magnesium sulfate; magnesium thiosulfate; manganese nitrate; manganese sulfate; manganese sulfide; manganese thiocyanate; mercury ammonium iodide; mercury potassium cyanide; molybdenum chloride; neodymium chloride; nickel bromide; nickel perchlorate; nickel iodide; nickel nitrate; nickel sulfate; osmium chloride; phosphorus chloride; phosphorus oxychloride; phosphorus sulfide; phosphorus thiocyanate; platinum bromide; platinum sulfate; praseodymium chloride; radium bromide; rhodium chloride; ruthenium chloride; samarium chloride; selenium oxyfluoride; silicon fluoride; silver perchlorate; strontium chlorate; strontium chloride; strontium sulfide; sulfur monochloride; tantalum bromide; tantalum chloride; terbium chloride; thallium bromide; thallium chloride; thallium iodide; thionyl chloride; thorium nitrate; tin iodide; titanium bromide; titanium chloride; tungsten bromide; tungsten chloride; uranium chloride; uranium nitrate; uranyl chloride; uranyl nitrate; vanadium bromide; vanadium chloride; vanadium fluoride; vanadyl sulfate; yttrium bromide; yttrium chloride; yttrium iodide; yttrium nitrate; zinc bromide; zinc iodide; zinc nitrate; zinc thiocyanate; zirconium chloride; zirconium bromide; zirconyl chloride; zirconyl iodide.

Following are examples of illustrative processes performed according to my invention producing in all cases new products according to my invention.

In the examples following only sodium alcoholates are shown. However, I have similarly used other alkali alcoholates such as potassium ethylate and potassium butylate with success. Admittedly, such other alkali alcoholates are much more expensive and react much more slowly and therefore cannot be expected to be used as extensively on a commercial basis.

*Example I*

Amounts of 200 gms. of wheat dextrin and
900 ml. of butanol were mixed together thoroughly and there were added to the mixture 68 gms. of sodium ethylate. This mixture was heated to 95° C. for two hours. The reaction equation was

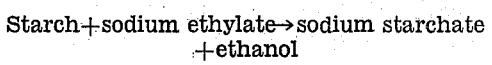

Starch+sodium ethylate→sodium starchate
+ethanol

The ethanol was distilled out of the mixture leaving the sodium starch suspended in the butanol. The sodium starch was further reacted without purification. If desired, it could be filtered, from the butanol, washed and dried.

*Example II*

A mixture of 200 gms. of corn starch and
900 ml. of butanol was mixed thoroughly and warmed to 50° C. There was added 96 gms. of sodium butylate. Heating was continued with agitation until the temperature reached about 115° C. The reaction mixture was then cooled to 60° C. and further reactants were added without purification of the sodium starchate thus produced.

*Example III*

A mixture of 200 gms. of wheat starch,
900 ml. glycerol, and
114 gms. of sodium glycerate was stirred and slowly warmed until the mixture thickened and the heating cautiously continued until a temperature of 95° C. was reached. An equal volume of butanol was added and the reaction product separated by filtration.

*Example IV*

A mixture of 200 gms. cellulose and
900 ml. butanol was warmed to 50° C. and there was added 54 gms. sodium methylate. Heating was continued until the temperature reached 95° C. The reaction equation was

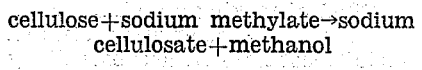

cellulose+sodium methylate→sodium
cellulosate+methanol

As the reaction proceeded, methanol was produced and as the temperature rose the methanol was removed from the system by distillation so

Example V

A reaction mixture of 200 gms. of thin boiling wheat starch,
1500 mls. absolute ethanol, and
160 gms. sodium ethylate was boiled at about 81° C. and was refluxed for two hours, filtered and washed with absolute ethanol. After a final washing with ether, the product was air dried and stored in a tight container.

Analysis of the product shows that the following reaction occurred:

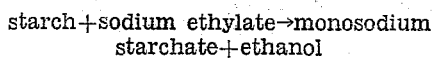

starch+sodium ethylate→monosodium starchate+ethanol

Example VI

A mixture of 200 gms. of thin boiling corn starch,
1200 ml. anhydrous propanol, and
82 gms. sodium propylate was heated to boiling and the boiling continued for two hours. The mixture was cooled and the product reacted further without purification. It could be separated by filtration if desired.

Example VII

A mixture of 200 gms. of corn starch,
1500 ml. of n-amyl alcohol, and
200 gms. of sodium butylate was prepared. This mixture was heated slowly under distillation and efficient agitation for one hour at 130° C. during which time the butanol formed in the reaction was distilled off. In performing this process, the course of the reaction may be determined by the amount of butanol recovered. Normally, one hour is satisfactory for the reaction but if the reaction has not proceeded satisfactorily, the heating period may be extended.

The reaction mixture was filtered hot and washed with a minimum of hot, dry, n-amyl alcohol and then reacted as desired. The disodium starchate, thus produced, is not very stable in the dry state and should be made only as needed.

It is to be understood that the above described embodiments of my invention are for the purpose of illustration only and various changes may be made therein without departing from the spirit and scope of my invention.

I claim:

1. A process of producing cellulosates which comprises the reaction of a cellulosic material with a nonaqueous alcoholic solution of an alkali metal alcoholate at a temperature of from about 80° C. to about 115° C.

2. A process of producing a cellulosate which comprises the reaction of a cellulosic material with a substantially nonaqueous alcoholic solution of sodium methylate in equimolar quantities at a temperature of from about 80° C. to about 115° C.

3. A method of making an alkali metal cellulosate from cellulose comprising dissolving an alkali metal alcoholate in a substantially nonaqueous alcohol; adding the solution to a cellulose; and refluxing the mixture at a temperature of from about 80° C. to about 115° C.

4. A process of treating cellulosic materials which comprises mixing said materials with a substantially nonaqueous alcoholic solution of an alkali metal alcoholate with the cellulosic material and the alkaline metal alcoholate supplied in approximately equimolar quantities; and heating to a temperature of from about 80° C. to about 115° C.

5. A process of producing substituted glucopyranose polymers which comprises the reaction of glucopyranose polymer with a nonaqueous solution of an alkali metal alcoholate at a temperature of from about 80° C. to about 115° C.

6. A process of producing a starchate which comprises the reaction of starch with a nonaqueous alcoholic solution of an alkali metal alcoholate at a temperature of from about 80° C. to about 115° C.

7. A process of producing substituted dextrins which comprises the reaction of dextrin with a nonaqueous alcoholic solution of an alkali metal alcoholate at a temperature of from about 80° C. to about 115° C.

8. A process of producing a glucopyranose polymer which comprises the reaction of a glucopyranose polymer with a nonaqueous alcoholic solution of sodium methylate in equimolar quantities at a temperature of from about 80° C. to about 115° C.

9. A method of making an alkali metal glucopyranose polymer from glucopyranose polymer comprising dissolving an alkali metal alcoholate in a substantially nonaqueous alcohol; adding the solution to a glucopyranose polymer; and refluxing the mixture at a temperature of from about 80° C. to about 115° C.

10. A process of treating glucopyranose polymer which comprises mixing said materials with a substantially nonaqueous alcoholic solution of an alkali metal alcoholate with the glucopyranose polymer and the alkaline metal alcoholate supplied in approximately equimolar quantities; and heating to a temperature of from about 80° C. to about 115° C.

11. A process of producing a cellulosate which comprises the reaction of a cellulosic material with a substantially anhydrous alcoholic solution of sodium methylate in equimolar quantities at a temperature of from about 80° C. to about 115° C.

12. A method of making an alkali metal cellulosate from cellulose comprising dissolving an alkali metal alcoholate in a substantially anhydrous alcohol; adding the solution to a cellulose; and refluxing the mixture at a temperature of from about 80° C. to about 115° C.

13. A process of treating cellulosic materials which comprises mixing said materials with a substantially anhydrous alcoholic solution of an alkali metal alcoholate with the cellulosic material and the alkaline metal alcoholate supplied in approximately equimolar quantities; and heating to a temperature of from about 80° C. to about 115° C.

14. A process for producing substituted glucopyranose polymers which comprises the reaction of glucopyranose polymer with a nonaqueous alcoholic solution of an alkali metal alcoholate at a temperature of from about 80° C. to about 115° C. with the glucopyranose polymer and the alkali metal alcoholate supplied in approximately equimolar quantities.

KENNETH M. GAVER.

References Cited

The following references are of record in the file of this patent:

UNITED STATES PATENTS

| Number | Name | Date |
|---|---|---|
| 2,094,100 | Dreyfus | Sept. 28, 1937 |
| 2,181,919 | Scherer | Dec. 5, 1939 |
| 2,294,924 | Miller | Sept. 8, 1942 |
| 2,300,413 | Gaver | Nov. 3, 1942 |
| 2,389,771 | Gaver | Nov. 27, 1945 |
| 2,397,732 | Gaver | Apr. 2, 1946 |
| 2,518,135 | Gaver | Aug. 8, 1950 |

OTHER REFERENCES

Organic Chem., Fieser & Fieser, 1944, pages 127–128.